United States Patent
Maas et al.

(10) Patent No.: US 7,507,270 B2
(45) Date of Patent: Mar. 24, 2009

(54) AGRICULTURAL WORKING VEHICLE WITH AIR SCOOP FOR AIR INTAKE SYSTEM

(75) Inventors: Brian Joseph Maas, Bettendorf, IA (US); Alan David Sheidler, Moline, IL (US); Robert Vincent Shannon, Jr., Bettendorf, IA (US); Yong Ho Park, Schaumburg, IL (US); Mark Michael Chaney, Bettendorf, IA (US); Gary Stone Keys, II, Bettendorf, IA (US)

(73) Assignee: Deere & Company, Moline, IL (US)

( * ) Notice: Subject to any disclaimer, the term of this patent is extended or adjusted under 35 U.S.C. 154(b) by 536 days.

(21) Appl. No.: 11/182,199

(22) Filed: Jul. 15, 2005

(65) Prior Publication Data

US 2007/0012000 A1    Jan. 18, 2007

(51) Int. Cl.
*B01D 46/24* (2006.01)
*B01D 46/48* (2006.01)
*F01P 7/02* (2006.01)

(52) U.S. Cl. .................. 55/385.3; 55/283; 55/301; 55/294; 55/467; 96/421; 123/198 E; 123/41.11; 123/41.49

(58) Field of Classification Search .................. 55/283, 55/301, 294, 385.3, 467; 96/421; 123/198 E, 123/41.11, 41.49
See application file for complete search history.

(56) References Cited

U.S. PATENT DOCUMENTS

| 2,730,084 A | 1/1956 | Stegman ................... 123/41.65 |
| 3,309,847 A | 3/1967 | Donaldson ................... 55/268 |
| 3,565,203 A | 2/1971 | Ashton et al. ................. 180/68 |
| 3,630,003 A * | 12/1971 | Ashton et al. ................. 56/14.7 |
| 3,636,684 A | 1/1972 | Vogelaar et al. .............. 56/14.7 |
| 3,837,149 A | 9/1974 | West et al. ..................... 55/269 |
| 4,439,218 A * | 3/1984 | Priepke et al. ................. 55/288 |
| 4,514,201 A | 4/1985 | Brown .......................... 55/385 |
| 4,667,629 A | 5/1987 | Hagarty ...................... 123/198 |
| 4,716,860 A | 1/1988 | Henriksson et al. ...... 123/41.05 |
| 4,934,449 A | 6/1990 | Watt et al. ..................... 165/41 |
| 5,944,603 A | 8/1999 | Guinn et al. ................. 460/100 |
| 6,193,772 B1 | 2/2001 | Wiefel |
| 6,202,777 B1 | 3/2001 | Surridge |
| 6,220,207 B1 | 4/2001 | Kawasaki et al. ......... 123/41.11 |
| 6,321,830 B1 | 11/2001 | Steinmann ................... 165/41 |

(Continued)

FOREIGN PATENT DOCUMENTS

EP    1 028 258    6/1999

(Continued)

OTHER PUBLICATIONS

European Search Report, Oct. 2, 2006, 5 Pages.

Primary Examiner—Duane S Smith
Assistant Examiner—Minh-Chau T Pham
(74) Attorney, Agent, or Firm—Taylor & Aust, P.C.

(57) ABSTRACT

A working vehicle, such as an agricultural combine, includes a vehicle body and an internal combustion engine carried by the vehicle body. The internal combustion engine includes a heat exchanger. An air scoop has an inlet positioned near a top of the vehicle body and facing in an upward direction, and an outlet positioned in association with the heat exchanger.

21 Claims, 3 Drawing Sheets

| U.S. PATENT DOCUMENTS | | | | GB | 1 425 464 | 3/1972 |
|---|---|---|---|---|---|---|
| 2001/0023574 A1 | 9/2001 | Kaesgen et al. | | GB | 1 433 596 | 7/1972 |
| 2004/0003578 A1* | 1/2004 | Twiefel | ............... 55/289 | GB | 1 412 216 | 1/1973 |

FOREIGN PATENT DOCUMENTS

| GB | 1 203 837 | 6/1968 |
|---|---|---|

* cited by examiner

AGRICULTURAL WORKING VEHICLE WITH AIR SCOOP FOR AIR INTAKE SYSTEM

FIELD OF THE INVENTION

The present invention relates to agricultural working vehicles, and, more particularly, to air intake systems for such vehicles.

BACKGROUND OF THE INVENTION

Work vehicles such as off road construction and agricultural vehicles are usually powered by combustion engines and operate in dirty environments. Often, an engine compartment is used to isolate the engine and cooling system from the dirty ambient air, which contains dust and other particulate matter. A work vehicle such as an agricultural harvester (e.g., combine) is also exposed to chaff (crop residue) from the crop being harvested. The crop harvesting process creates dust, dirt, and chaff that surrounds the vehicle. Hot engine exhaust is also discharged from the vehicle.

During operation, clean air is needed for efficient combustion in the internal combustion (IC) engine and cool air is needed for efficient engine and vehicle cooling system operation. More particularly, the air supply must be free of debris and dust so as to mix with the fuel to provide combustion in the IC engine. The combustion air intake usually includes an air pre-filter and a separate air cleaner. Further, the air supply must be free of debris and dust for use as cooling air to cool the combustion engine, hydraulic system and cab air conditioning system of the work vehicle.

The air management system on some current combines involves drawing air through a louvered side panel into the cooling package. A rotating rotary screen with a vacuum cleaning system is used to pre-clean the dirty air before it passes through the heat exchangers of the cooling package. A combustion air inlet is located downstream of the rotary filter and has a separate pre-cleaner and air filter for the combustion air supplied to the engine.

However, prolonged use during harvesting operations can result in plugging of the rotary screen, plugging of the cooling package cores, plugging of the pre-cleaner, short air filter life, and excess debris accumulation on the engine deck. These affects of dirty air often require the operator to stop the vehicle and clean the air management system. Structural changes to the vehicle have reduced debris accumulation on the engine deck. However, the root cause of the dust and chaff in the intake air remains a problem.

SUMMARY OF THE INVENTION

The present invention provides an air scoop having an inlet positioned above the vehicle body to draw cleaner air through the rotary screen and heat exchanger(s).

The invention comprises, in one form thereof, a working vehicle such as an agricultural combine, including a vehicle body and an internal combustion engine carried by the vehicle body. The internal combustion engine includes a heat exchanger. An air scoop has an inlet positioned near a top of the vehicle body and facing in an upward direction, and an outlet positioned in association with the heat exchanger.

The invention comprises, in another form thereof, an internal combustion engine assembly, including an internal combustion engine having a heat exchanger. An engine housing at least partially encloses the internal combustion engine. An air scoop has an inlet positioned above the engine housing and facing in an upward direction, and an outlet positioned in fluid communication with the engine housing and facing toward the heat exchanger. An air exhaust chimney has an inlet in fluid communication with the engine housing, and an outlet positioned above the engine housing and facing in an upward direction.

DETAILED DESCRIPTION OF THE INVENTION

Figure 1:
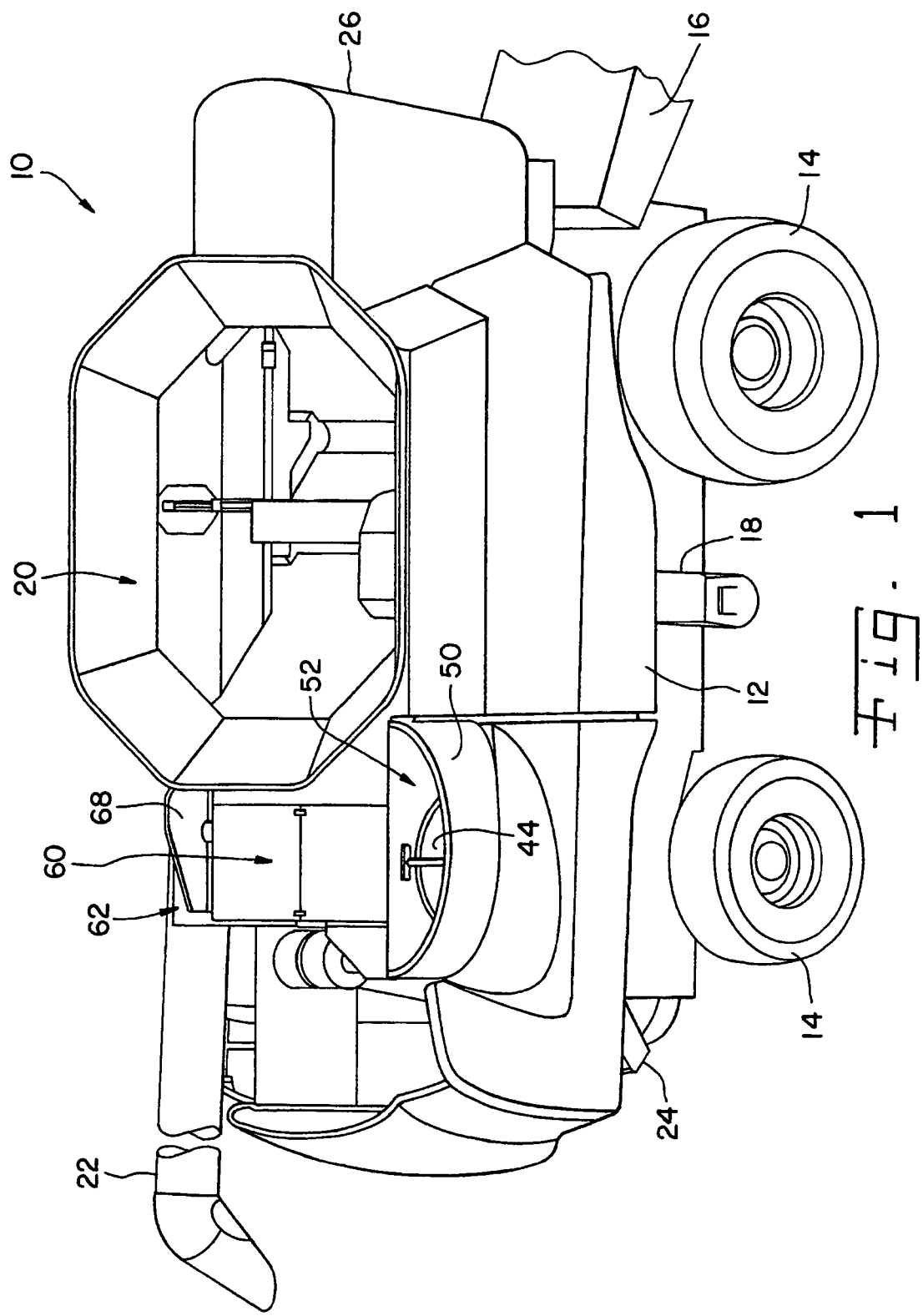
FIG. 1 is a perspective view of an agricultural combine including an embodiment of an internal combustion engine assembly of the present invention.

Referring now to the drawings, and more particularly to FIG. 1, there is shown a working vehicle in the form of an agricultural harvesting machine, such as an agricultural combine 10. The working vehicle can also be in the form of a different type of vehicle used in a dirty or chaff laden operating environment, such as an agricultural tractor, self propelled forage equipment, etc.

Combine 10 includes a supporting structure or body 12 having ground engaging wheels 14 extending from body 12. Although combine 10 is illustrated as having wheels 14, it could also have ground engaging tracks, either full tracks or half tracks. A harvesting platform (not shown), such as a soybean head or corn head, is used for harvesting a crop and directing it to a feederhouse 16. The harvested crop is directed by feederhouse 16 to internal workings of combine 10 not specifically shown in FIG. 1, such as an axial crop processing unit which threshes and separates the harvested crop material. Grain and chaff fall through grates below the crop processing unit to a cleaning system which removes the chaff and directs the clean grain via a clean grain elevator 18 to grain hopper 20. The clean grain in hopper 20 is typically unloaded into a gravity wagon or truck using unloading auger 22. The threshed and separated crop material other than the grain is transported via a discharge beater to a straw chopper 24, which chops and flails the non-grain material back to the field. The operation of combine 10 is controlled from an operator's cab 26.

Mechanical power for combine 10 is provided by an IC engine 28 carried by body 12. IC engine 28 is substantially enclosed within an engine compartment, the purpose of which will be described in further detail hereinafter. In one embodiment, the engine compartment is in the form of an engine housing 60 which substantially surrounds and is manufactured with IC engine 28. In other words, during manufacture of IC engine 28, IC engine 28 may be mounted to a standalone frame to which housing panels are attached, and the frame in turn mounted to combine 10.

Figure 2:
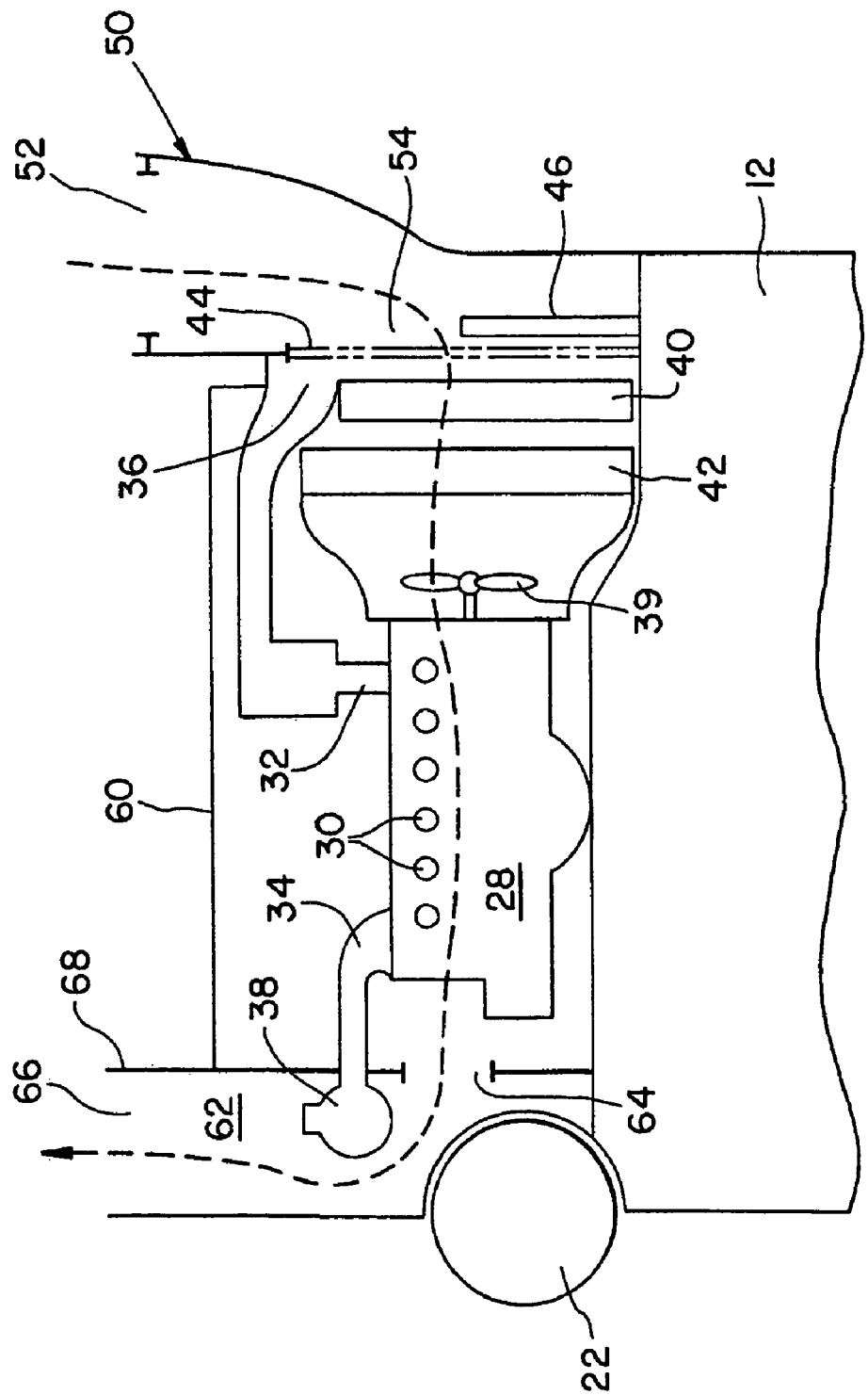
FIG. 2 is a side, schematic view of the internal combustion engine assembly used in the combine of FIG. 1.

IC engine 28, in known manner, includes a plurality of combustion cylinders 30 (FIG. 2) which are in fluid communication with an intake manifold 32 and an exhaust manifold 34. Intake manifold 32 receives combustion air via a combustion air duct 36, and provides combustion air to combustion cylinders 30. In the embodiment shown, a turbocharger system (not specifically shown) is utilized for providing compressed charge air to combustion cylinders 30. Exhaust gas is discharged from combustion cylinders 30 to muffler 38 via exhaust manifold 34. The exhaust gas from muffler 38 is discharged to the ambient environment.

IC engine 28 also includes a fan 39 which draws ambient air through one or more heat exchangers and directs the air through engine housing 60 to remove heat from IC engine 28 primarily via air convection heat transfer. In the embodiment shown, IC engine 28 includes two heat exchangers in the form of a radiator 40 and charge air cooler 42. Radiator 40 cools the liquid coolant circulated within IC engine 28, and charge air cooler 42 cools the compressed and heated air which is discharged from the turbocharger.

At the upstream side of radiator 40 and charge air cooler 42 is a rotary screen 44 which rotates during use and is used for removing coarse particulate matter such as chaff, straw, etc. prior to flowing past radiator 40. A vacuum 46 vacuums the particulate matter from the outer surface of rotary screen 44 during each revolution of rotary screen 44.

According to one aspect of the present invention, an air scoop 50 is positioned adjacent the upstream side of rotary screen 44 and vacuum 46. Air scoop 50 has an inlet 52 and an outlet 54. Air scoop inlet 52 is positioned above the housing of IC engine 28, and is positioned near or above the top of combine body 12. Typically, chaff and dust laden air which is used within combine 10 hovers several feet above the ground level. By positioning air scoop inlet 52 above the height of combine body 12 and facing air scoop inlet 52 in an upward direction, the air which is used in IC engine 28 is substantially cleaner. This in turn reduces the amount of foreign matter which must be screened and filtered from the incoming air.

Air scoop 50 has a generally L-shaped flow path defined by outer wall 56 extending from inlet 52 to outlet 54. The L-shaped flow path directs the incoming air from a generally vertically downward direction to a generally horizontal direction entering rotary screen 44. Air scoop outlet 54 is positioned in association with rotary screen 44 such that a sufficient flow of air flows through radiator 40, charge air cooler 42 and past IC engine 28. In the embodiment shown, air scoop outlet 54 has a generally U-shaped cross-section, with the curved part of the cross-section approximating the circular shape of rotary screen 44. The curved transition in outer wall 56 of air scoop 50 between inlet 52 and outlet 54 redirects the air in the horizontal direction to rotary screen 44 without substantial restriction.

The outer wall 56 of air scoop 50 extending between air scoop inlet 52 and air scoop outlet 54 covers rotary screen 44 in a horizontal direction. With a conventional combine using a louvered panel on the outside of rotary screen 44, a strong cross-wind blowing into rotary screen 44 can affect the performance of vacuum 46, which in turn means that the removal of foreign matter from rotary screen 44 is less than optimal. On the other hand, since outer wall 56 of air scoop 50 covers rotary screen 44 in a horizontal direction, a strong cross-wind is deflected by outer wall 56 and does not deleteriously affect the performance of rotary screen 44 or vacuum 46.

According to another aspect of the present invention, IC engine 28 is substantially enclosed within engine housing 60, and air is drawn through air scoop 50 at one end of engine housing 60, and discharged at an opposite end of engine housing 60 through an air exhaust chimney 62. Air exhaust chimney 62 has an inlet 64 which is in fluid communication with and receives the flow of air which flows past IC engine 28. Air exhaust chimney 62 has an outlet 66 which is positioned above engine housing 60 and also near or above combine body 12. Air exhaust chimney outlet 66 opens in an upward direction to exhaust the heated air from engine housing 60 to the ambient environment above the upper level of combine body 12. By positioning outlet 66 in an upward facing direction above the upper level of combine body 12, the exhaust gas which is discharged on one side of combine 10 is inhibited from reintroduction as intake air on the opposite side of combine 10 through air scoop 50.

Figure 3:
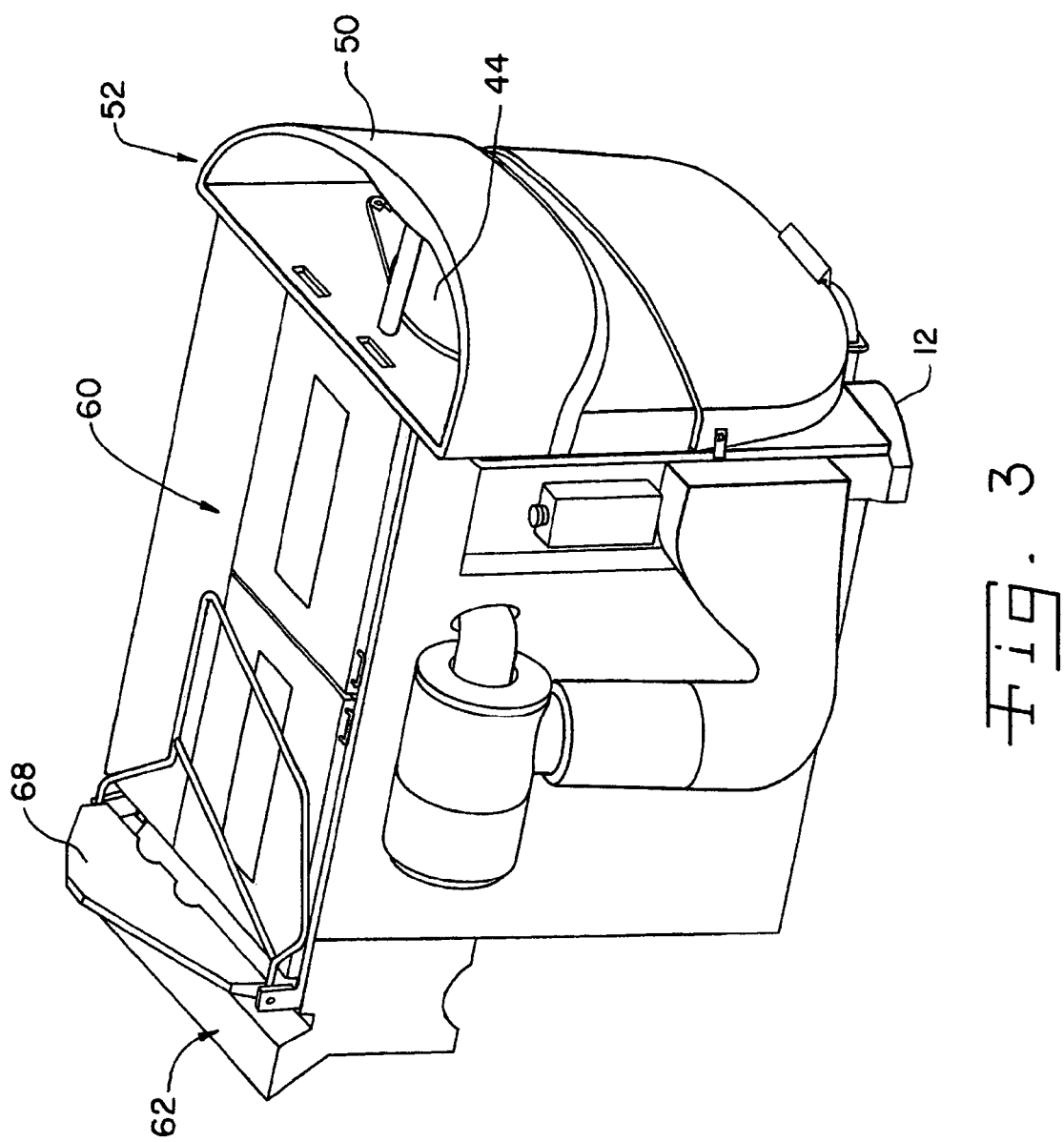
FIG. 3 is a perspective view of the internal combustion engine assembly of FIG. 2.

In the embodiment shown, muffler 38 is positioned within air exhaust chimney 62 such that the hot exhaust gases discharged from muffler 38 flow in an upward direction to the ambient environment. The flow of hot exhaust gases in an upward direction creates a chimney or upward draft effect which increases the discharge flow velocity to the ambient environment, and further inhibits a cross-drafting of the exhaust gases and/or heated cooling air from one side of the combine to the other to ensure that clean, cool air is drawn through air scoop 50 (FIG. 3).

To further assist in discharging the exhaust gases and heated cooling air to the ambient environment without the risk of cross-drafting to air scoop 50, an upstanding wall 68 acting as an air diverter directs the discharged gases further away from the upper surface of combine body 12. In the embodiment shown, a single upstanding wall 68 is provided on the side of air exhaust chimney 62 which is closest to air scoop 50 (FIG. 3). Of course, it will be appreciated that the number, height and shape of the upstanding wall(s) used to prevent cross-drafting can be empirically determined, depending upon the application.

During operation, air is drawn through air scoop 50 and is diverted from a vertically downward direction to a horizontal direction entering rotary screen 44. The air is substantially cleaner since air scoop inlet 52 opens in an upward direction at or above combine body 12. However, any foreign matter which is deposited on rotary screen 44 is removed by vacuum 46. The air passing through rotary screen 44 then travels through the cooling cores of radiator 40 and charge air cooler 42, drawn under the influence of fan 39. The air is then moved in an axial direction through fan 39 and past IC engine 28 before entering air exhaust chimney inlet 64. The air is heated as it flows through radiator 40 and charge air cooler 42, and past IC engine 28, and therefore naturally rises through air exhaust chimney 62. The heated air mixes with the exhaust gases from muffler 38, which is even hotter and under pressure. The gases are then discharged from air exhaust chimney outlet 66 to the ambient environment. Any cross-drafting of discharged gases is inhibited, even in a strong cross-wind from air exhaust chimney 62 to air scoop 50, by discharging the gases in an upward direction above the combine body 12.

Although the invention is illustrated as being used on a rotary combine, the present invention can be used on other combine types including conventional straw walker combines and hybrid combines having transverse threshing cylinders and rotary separators.

Having described the preferred embodiment, it will become apparent that various modifications can be made without departing from the scope of the invention as defined in the accompanying claims.

The invention claimed is:

1. A working vehicle, comprising:
    a vehicle body;
    an internal combustion engine carried by said vehicle body, said internal combustion engine including a heat exchanger, said internal combustion engine being substantially enclosed within an engine compartment, and further including an air exhaust chimney in fluid communication with and extending from said engine compartment; and
    an air scoop having an inlet and an outlet, said inlet positioned near a top of said vehicle body and facing in an upward direction, said outlet positioned in association with said heat exchanger, said air exhaust chimney having an upwardly opening outlet, and said internal combustion engine including an exhaust outlet positioned within said air exhaust chimney to direct hot exhaust gases in an upward direction, creating a draft for gases within said air exhaust chimney.

2. The working vehicle of claim 1, further including a rotary screen positioned at said air scoop outlet, upstream from said heat exchanger.

3. The working vehicle of claim 2, wherein said air scoop outlet has a cross section approximating said rotary screen.

4. The working vehicle of claim 2, wherein said rotary screen includes a vacuum.

5. The working vehicle of claim 1, wherein said air scoop has a generally L shaped flow path from said inlet to said outlet, directing air from a generally vertically downward direction to a generally horizontal direction.

6. The working vehicle of claim 1, wherein said heat exchanger includes at least one of a radiator and a charge air cooler.

7. The working vehicle of claim 1, wherein said vehicle body includes an engine compartment, said internal combustion engine positioned at least partially within said engine compartment.

8. The working vehicle of claim 7, wherein said internal combustion engine is substantially fully enclosed within said engine compartment.

9. The working vehicle of claim 8, wherein said engine compartment is an engine housing carried by said vehicle body.

10. The working vehicle of claim 1, wherein said air scoop outlet is positioned at one end of said engine compartment, and said air exhaust chimney is positioned at an opposite end of said engine compartment.

11. The working vehicle of claim 10, wherein said internal combustion engine is mounted transversely within said vehicle body, said air scoop outlet is positioned on one side of said vehicle body, and said exhaust chimney is positioned on an opposite side of said vehicle body.

12. The working vehicle of claim 1, wherein said air exhaust chimney has an outlet positioned said top of said vehicle body.

13. The working vehicle of claim 1, wherein said air scoop has a generally semi-circular inlet and a generally U-shaped outlet.

14. The working vehicle of claim 13, wherein said air scoop has an outer wall with a curved transition between said inlet and said outlet.

15. The working vehicle of claim 13, wherein said outlet faces in a generally horizontal direction.

16. The working vehicle of claim 1, wherein said working vehicle comprises an agricultural combine.

17. An internal combustion engine assembly, comprising:
an internal combustion engine including a heat exchanger;
an engine compartment at least partially enclosing said internal combustion engine;
an air scoop having an inlet and an outlet, said air scoop inlet positioned above said engine housing and facing in an upward direction, said air scoop outlet positioned in fluid communication with said engine housing and facing toward said heat exchanger; and
an air exhaust chimney having an inlet and an outlet, said air exhaust chimney inlet in fluid communication with said engine housing, said air exhaust chimney outlet positioned above said engine housing and facing in an upward direction, said internal combustion engine including an exhaust outlet positioned within said air exhaust chimney to direct hot exhaust gases in an upward direction, creating a draft for gases within said air exhaust chimney.

18. The internal combustion engine assembly of claim 17, wherein said air scoop has a generally L shaped flow path from said air scoop inlet to said air scoop outlet, directing air from a generally vertically downward direction to a generally horizontal direction.

19. The internal combustion engine assembly of claim 17, wherein said heat exchanger includes at least one of a radiator and a charge air cooler.

20. The internal combustion engine assembly of claim 17, wherein said air scoop outlet is positioned at one end of said engine housing, and said air exhaust chimney inlet is positioned at an opposite end of said engine housing.

21. A working vehicle comprising:
a vehicle body;
an air breathing, fuel consuming internal combustion engine carried by said vehicle body, said internal combustion engine including a heat exchanger;
an engine compartment carried by said vehicle body, said internal combustion engine being at least partially enclosed in said engine compartment;
an air scoop having an inlet and outlet, said inlet positioned near a top of said vehicle body and facing in an upward direction, said outlet positioned in association with said heat exchanger; and
a combustion air intake for said engine positioned in association with said air scoop outlet.

* * * * *